(No Model.)
D. L. RILEY.
PERCOLATOR.
No. 552,003. Patented Dec. 24, 1895.
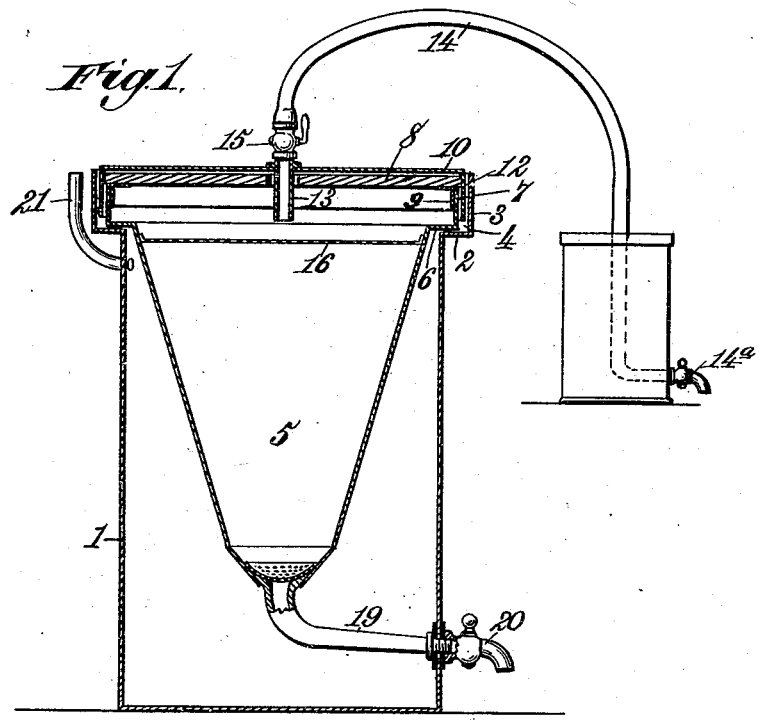
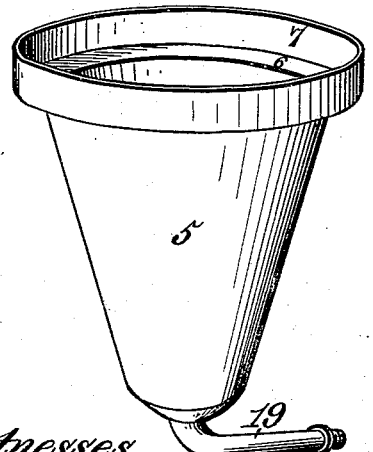
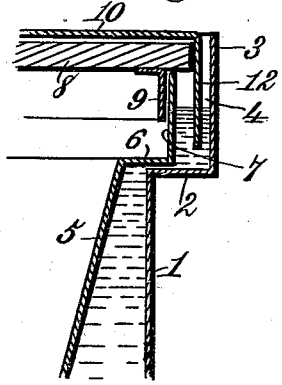
Witnesses:
Robert Everett.
Geo. W. Rea.
Inventor:
David L. Riley,
By James L. Norris.
Atty.

UNITED STATES PATENT OFFICE.

DAVID L. RILEY, OF CANTON, TEXAS.

PERCOLATOR.

SPECIFICATION forming part of Letters Patent No. 552,003, dated December 24, 1895.

Application filed September 5, 1895. Serial No. 561,564. (No model.)

*To all whom it may concern:*

Be it known that I, DAVID L. RILEY, a citizen of the United States, residing at Canton, in the county of Van Zandt and State of Texas, have invented new and useful improvements in water-bath percolators for extracting the soluble constituents of various substances, of which the following is a specification.

My invention relates to water-bath percolators and stills for extracting the soluble constituents of various substances. It is my purpose to provide an apparatus of this type which shall be simplified in construction, improved in operation and reduced in cost of production or manufacture.

It is a further purpose of my invention to provide a percolator having a simple and improved construction whereby the lid or cover may be sealed hermetically whenever it is desirable to exclude air or prevent the escape of vapor or volatile constituents.

It is my object, also, to provide a percolator consisting of an inner vessel and an outer water-reservoir, the inner vessel being so formed that it may be readily connected to the reservoir in such manner as to form a rigid and practically a permanent portion of the same, its disconnection and removal being readily and quickly effected, when necessary.

My invention also comprises certain other features of novelty, all of which will be described in the following specification and then specifically pointed out and defined in the claims which conclude said specification.

To enable those skilled in the art to which my invention pertains to fully understand and practice the same, I will now describe said invention in detail, reference being had for this purpose to the accompanying drawings, in which—

Figure 1 is a central vertical section showing my invention embodied in a percolator having a surrounding water-reservoir, to which the percolator is rigidly connected. Fig. 2 is a perspective view showing the percolator removed from the water-reservoir. Fig. 3 is a detail section taken centrally through the upper portion of the parts shown in Figs. 1 and 2 and upon a scale somewhat enlarged to show the construction.

The reference-numeral 1 in said drawings indicates a substantially cylindrical vessel, formed of copper or other suitable material and of any desired size. At a little distance below its top the vertical wall of the same forms a right angle with an annular portion 2, which extends outward and forms a horizontal circular flange. From its outer edge rises a circular vertical wall 3 of suitable height. This wall 3 and the horizontal flange 2 partly inclose an annular space 4, the function of which will be explained hereinafter.

The reference-numeral 5 denotes the percolator, which consists of a substantially conical vessel formed of suitable material, the contracted end being the bottom and having either the form of an inverted cone of small altitude or of a segment of a hollow sphere. The large open top of the percolator is of such diameter that it fits loosely in the open top of the vessel 1.

The top of the percolator is provided with an outwardly-projecting flange 6, of such width that it will partly cover the flange 2 on the water-reservoir 1. From the outer edge of the flange 6 rises a circular vertical wall 7 of such height that its upper edge will be a little below the corresponding edge of the wall 3 when the percolator is in place. The open top of the latter is closed by a circular cover or lid 8, having a flange 9 projecting from its lower face at a point very near the edge of the cover, the outside diameter of the circular flange being such that it can fit readily within the circular wall 7, while the edge of the lid projecting beyond the flange 9 rests on the edge of the said wall 7. Over the cover 8 is placed a separate cover 10, having a flange 12, which encircles the edge of the cover and the outer face of the wall 7, dropping to a suitable point below same and into the annular space between said wall 7 and the circular wall 3. The cover is provided with a central tubular neck 13, which rises a little above the outer cover 10 and is rigidly connected to same and communicates with the interior of the percolator. It is also provided with an attachment, consisting of a pipe or tube 14, which may be used in driving off and condensing the tincture or extract.

The condensing attachment 14 is constructed preferably in the form of a semicircular, or nearly semicircular, tube, so that one end of the same can be rigidly connected to the tubular neck 13. The condensing pipe or tube passes through a vessel of cold water, thereby condensing the vapor, which passes from the percolator through the condensing pipe or tube. At the other or lower end of the condensing pipe or tube is a stop-cock 14$^a$ for the purpose of discharging the condensed liquid, as shown in the drawings. The neck 13 is provided with a suitable valve or cock 15. Beneath the end which opens into the percolator is arranged a diaphragm 16, provided with numerous perforations, whereby a suitable menstruum—such as water, alcohol, steam, or any other solvent used—may be showered through the tubular neck 13 upon the material undergoing extraction.

At the lower or contracted end of the percolator a discharge-pipe 19 is connected. This pipe extends downward about one inch and is then bent at a right angle or nearly so, as shown in the drawings. It extends toward one side and passes through the cylindrical wall of the reservoir 1, and to the end of said pipe, outside the reservoir, a stop-cock or faucet 20 is attached by screwing said cock on the end of the pipe. The discharge-pipe must be so arranged where it passes through the wall of the reservoir that leakage will be prevented when the reservoir is filled with water, and in such manner, also, that the stop-cock can be disconnected from its end by unscrewing, whereby the percolator can be lifted out of the reservoir. In the lower end of the percolator is placed a concave circular piece of sheet metal, or other suitable material, having numerous perforations of suitable size, whereby the fluid shall be allowed to pass, but the solid matter of every sort shall be retained. I may substitute any other suitable material in place of a perforated sheet—such, for example, as wire-gauze or a filtering material.

The water-reservoir 1 is supplied with water through a filling-pipe 21, and the water is brought to such a level that it passes above the circular flange 2 and enters the space between the upright circular walls 3 and 7, thereby submerging the edge of the outside cover or lid 10 and sealing the percolator hermetically.

When the menstruum has passed through the percolator, and the active principle has been extracted from the drug or ingredient in the percolator, the drug or other ingredients is removed, and the extract to be condensed is then returned to the percolator, the stop-cock 20 being previously closed. The cover 10 is then placed over the top, and the condensing pipe or tube 14 is adjusted to the percolator by connecting it to the neck 13. Heat is then applied to the water-bath, which surrounds the percolator, thereby communicating the heat to the percolator, which can be regulated to any required degree. The required degree of heat may be determined by means of applying a thermometer to the water in the water-bath. The water-bath must be so filled with water that the annular space or chamber 4 will be so far filled as to submerge the edge of the cover 10 in order to prevent the escape of steam from the interior while distillation is proceeding.

The manner of using the apparatus is so familiarly known to all skilled in the art that it requires no description.

What I claim is—

1. A percolator consisting of an outer water-reservoir having a circular flange projecting outwardly at its top, and a vertical circular wall rising from the outer edge of said flange, an inner vessel having a similar flange and vertical wall rising therefrom, a lid or cover for the inner vessel having a flange dropping from its lower face and adapted to pass within the circular vertical wall, and an independent, outer cover having a central tubular neck adapted to pass through the cover of the inner vessel and provided with a flange which is adapted to lie in the annular space between the two circular, vertical walls on the outer and inner vessels, respectively, and be partly submerged, substantially as described.

2. A percolator comprising an outer-reservoir having a circular flange and a vertical wall rising from it, an inner vessel having a similar flange and wall, a cover for the inner vessel having a flange passing inside, a separate cover having a flange lying outside and adapted to lie in an annular space between the two vertical, circular walls, said covers having a central tubular neck provided with a faucet, and a diaphragm for the upper end of the inner vessel lying below the tubular neck passing centrally through the covers, whereby a fluid may be showered upon the contents of the inner vessel, a second diaphragm in the lower end of said vessel above a discharge pipe projecting from its side and passing through the outer wall of the reservoir, and a condensing pipe or tube, one end of which is connected to the tubular neck attached to and passing through the lid or cover of the percolator, said pipe or tube passing through a vessel of cold water, thereby condensing the vapor passing through said pipe or tube from the percolator, substantially as described.

In testimony whereof I have hereunto set my hand in presence of two subscribing witnesses.

DAVID L. RILEY.

Witnesses:
R. M. LIVELY,
G. M. HILLIARD.